S. B. McHENRY.
AUTOMOBILE ENGINE STARTING MEANS.
APPLICATION FILED JULY 27, 1920.

1,407,556.

Patented Feb. 21, 1922.
3 SHEETS—SHEET 2.

S. B. McHenry INVENTOR
BY Victor J. Evans
ATTORNEY

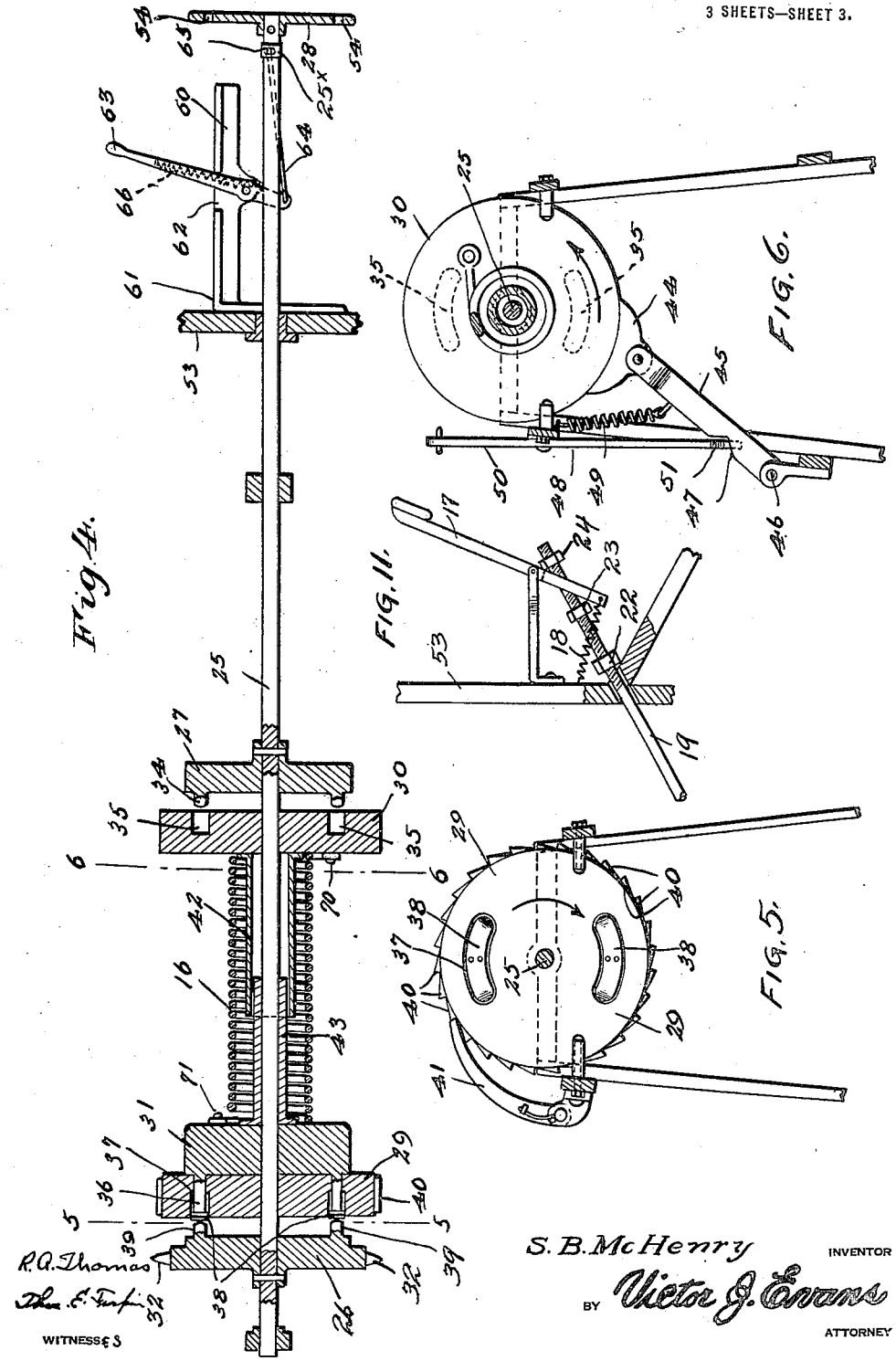

UNITED STATES PATENT OFFICE.

SAMUEL B. McHENRY, OF BLOOMSBURG, PENNSYLVANIA.

AUTOMOBILE-ENGINE-STARTING MEANS.

1,407,556. Specification of Letters Patent. Patented Feb. 21, 1922.

Application filed July 27, 1920. Serial No. 399,372.

*To all whom it may concern:*

Be it known that I, SAMUEL B. McHENRY, a citizen of the United States, residing at Bloomsburg, in the county of Columbia and State of Pennsylvania, have invented new and useful Improvements in Automobile-Engine-Starting Means, of which the following is a specification.

My present invention has for its object the provision of simple and practical means for starting an automobile engine; the said means being characterized by several advantageous capacities of function as hereinafter set forth.

To the attainment of the foregoing the invention consists in the improvement as hereinafter described and definitely claimed.

In the accompanying drawings, hereby made a part hereof:—

Figure 4 is a longitudinal section showing the main shaft of my improvement and the parts thereon, and also the spring as wound.

Figures 5 and 6 are transverse sections taken in the planes indicated by the lines 5—5 and 6—6, respectively, of Figure 4.

Figure 7 is a face view of the clutch member of the engine shaft.

Figure 8 is a face view of the clutch member of the hand-crank shaft.

Figure 9 comprises disconnected sectional views of the clutch members.

Figure 10:
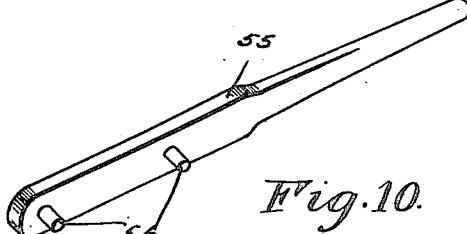

Figure 10 is a perspective of the wrench that is employed when the driver of the automobile desires to manually place the starting spring under tension without leaving his seat.

Figure 11 is an enlarged detail view illustrative of the pedal lever 17 and the parts adjacent thereto.

Similar numerals of reference designate corresponding parts in all of the views of the drawings.

The automobile engine illustrated is provided with the usual shaft 1, and fixed to the said shaft is a clutch member 2 having diametrically opposite recesses 3, Figure 7, and also having beveled teeth 4. The hand-crank shaft is numbered 5 and is provided at 6 with diametrically opposite pins. Loose on the hand-crank shaft 5 is a clutch member 7, which clutch member 7 is characterized by sprocket teeth 8, by diametrically opposite lugs 9, Figure 8, by a chamber 10 to receive the pins 6 when the member 7 is to be turned independently of the shaft 5, and by an inner reduced chamber 11 for the reception of the pins 6 when the member 7 is to be manually turned through the medium of the shaft 5. In this connection it will be noted that the shaft 5 is provided with a crank 12 and is subject to the action of a spring 13 that tends to move the pins 6 into inner chamber 11 of the clutch member 7. At this point I would have it understood that I prefer to provide the shaft 5 with spaced pins 14, for cooperation with a pivoted fastening lever 15, the purpose of which is to cooperate with the pins 14 and thereby hold the shaft 5 against forward movement under the action of the spring 13 with a view to positioning the pins 6 in the chamber 10 of the clutch member 7 so as to prevent said pins 6 from interfering with the rotation of the clutch member 7 independently of the shaft 5.

When it is desired to utilize the rotation of the shaft 1 by the engine to compress or place under tension the starting spring 16 of my improvement it is necessary to move the clutch member 7 so as to place the lugs 9 thereof into the recesses 3 of the clutch member 2. The said engagement of the clutch member 7 with the member 2 may be effected by the driver pressing forwardly on the upper arm of the pedal lever 17, Figure 1, the lower arm of the said pedal lever 17 being connected by a retractile spring 18 with the automobile body, Figures 1 and 11, and being also connected by a rod 19 with the clutch member 7, the rod 19 terminating at its forward end in a circular portion 20 disposed in a circumferentially grooved portion 21 of the clutch member 7. It is essential that the movement of the clutch member 7 through the medium of the lever 17 be nicely adjusted, and I therefore thread the rear portion of the rod 19 and equip said rear portion with three nuts 22, 23, and 24; the said nut 22 being adapted to bring up against the automobile body to limit the forward movement of the rod 19, and the nuts 23 and 24 being located at opposite sides of the lower arm of the lever 17. I would also have it understood at this point that when desired the automobile operator may by grasping the crank 12 move the shaft 5 rearwardly so as to engage the pins 6 with the teeth 4 of the clutch member 2, whereupon the operator by turning the crank 12 may manually crank or start the engine. Again by grasping the crank 12 and moving the shaft 5 forwardly so as to position the pins 6 in the inner chamber 11 of the clutch member 7 the driver by rotating the crank 12 is enabled to place the spring 16 under tension while standing in front of the automobile. From this it will be clearly understood that it is desirable for the clutch member 7 to be positioned so that the chamber 10 receives the pins 6 when the clutch member 7 is to be turned from the engine shaft 1 through the medium of the clutch member 2.

Supported in the advantageous manner illustrated relatively to the engine or in any other manner compatible with the purpose of my invention is what I designate the main shaft 25 of my improvement. See Figures 3 to 6 in particular. Fixed to the shaft 25 are the following elements, viz., a clutch member 26, a clutch member 27 and a disk 28, and loose on the said shaft 25 are a clutch member 29, a clutch member 30 and a clutch member 31. The clutch member 26 is provided with sprocket teeth 32 for the engagement of the sprocket belt 33 through the medium of which the clutch member 26 is connected with the clutch member 7. The clutch member 27 is provided with pins 34 to enter sockets 35 in the adjacent clutch member 30, and the clutch member 31 is provided with pins 36, movable in the openings 37 of the clutch member 29, said openings 37 being equipped with followers 38, the function of which is to engage the pins 39 on the clutch member 26 and thereby disengage the clutch member 26 from the clutch member 29. On its periphery the clutch member 29 is provided with ratchet teeth 40, and for cooperation with said ratchet teeth 40 I provide the spring-pressed pawl 41, which is designed to permit of rotation of the clutch member 29 in the direction indicated by arrow in Figure 5 and to prevent rotation of said clutch member 29 in the opposite direction. For the proper support of the starting spring 16 between the clutch members 30 and 31 and about the shaft 25 I provide a sleeve 42 on the clutch member 30 which sleeve 42 telescopically receives a sleeve 43 on the clutch member 21. The clutch member 30 is provided with a smooth periphery, Figure 6, and opposed to said periphery is a shoe 44 on a lever 45 that is fulcrumed at 46 and is provided at 47 with an abutment for the engagement of a lever 48. It will also be noted that a retractile spring 49 is interposed between the lever 45 and the support frame of my improvement and is so relatively arranged as to hold the shoe 44 under yielding pressure against the periphery of the clutch member 30. Manifestly the pivoted shoe 44 will normally operate to permit of rotation of the clutch member 30 in the direction indicated by arrow in Figure 6 while preventing rotation of said clutch member 30 in the opposite direction. For the manual disengagement of the shoe 44 from the clutch member 30 as when it is desired for the said clutch member 30 to be rotated in the last-named direction I provide the lever 50, Figures 1 and 6, which lever 50 is fulcrumed on the frame of the improvement, is provided on its lower arm with a cam portion 51 to cooperate with the abutment 47 of the lever 45, and has a rod 52 connected to its upper arm and extended rearwardly through the dash 53 of the automobile body.

It will be observed by reference to Figure 4 that the disk 28 is provided with apertures 54 at opposite sides of its center, and for cooperation with the said apertured disk 28 I provide a hand wrench 55 such as shown in Figure 10, said wrench having pins 56 to enter the apertures 54, and being designed when not in use to be carried at any appropriate place in or on the automobile body. The said wrench 55 is designed for use in cooperation with the disk 28 when the driver of the automobile desires to manually place the spring 16 under tension without leaving his seat.

Figure 1:
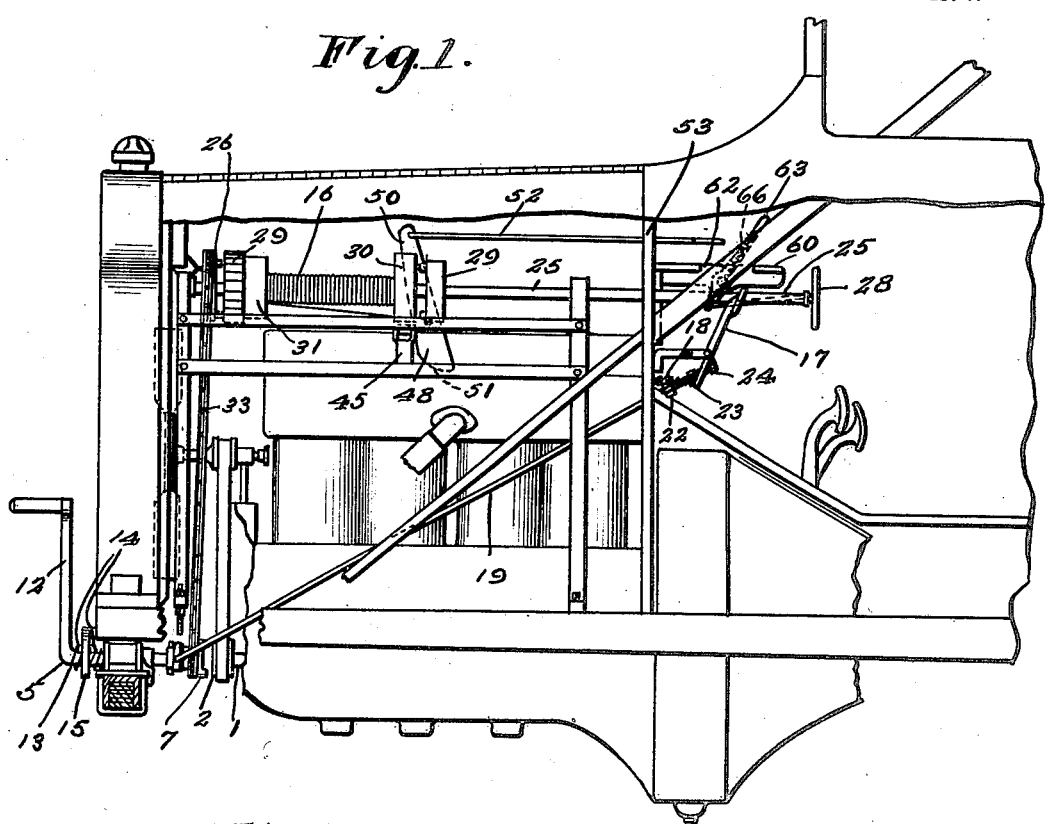
Figure 1 is a side elevation showing my improvement in proper relation to an automobile engine.
Figure 2:
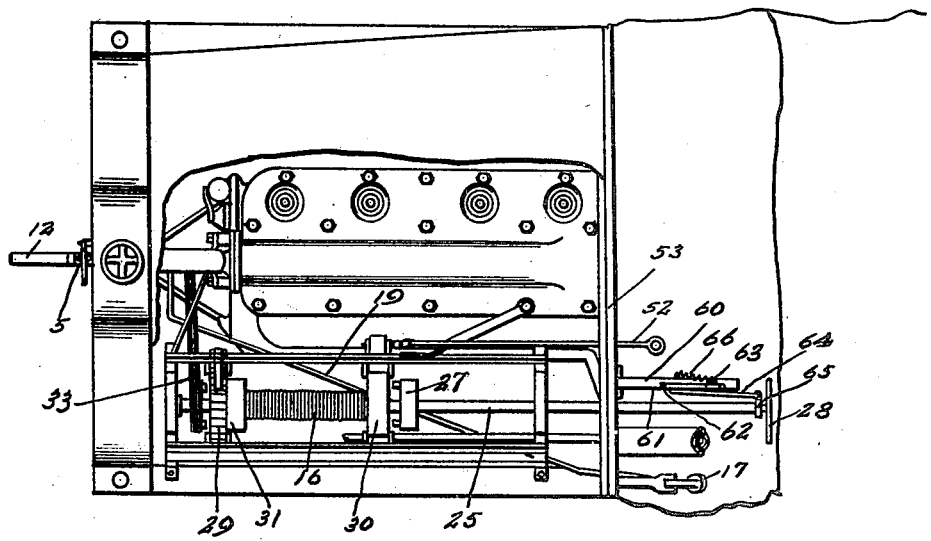
Figure 2 is a view of the same.
Figure 3:
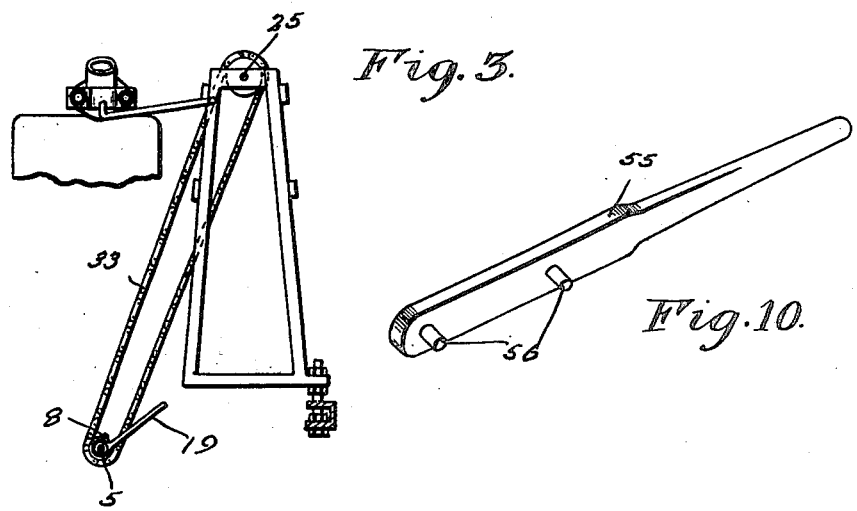
Figure 3 is an end view, diagrammatic in character and showing the arrangement of the shafts comprised in my improvement relatively to the engine.

Fixed to and extending rearwardly from the dash 53, as shown in Figures 1, 2 and 4 is a bracket arm 60 on which is a flange 61 in which is formed a play space 62. Fulcrumed on the bracket arm 60 is a hand lever 63 the upper arm of which is possessed of resilient quality and is therefore adapted to be sprung laterally out and into the said play space 62 in the flange 61. The lower arm of said lever 63 is connected through a link 64 with the rear portion of the shaft 25 at the point indicated by 65, and connected to the upper arm of the lever 63 is one end of a retractile spring 66, said spring 66 being arranged at the opposite side of the arm 60, with reference to the lever 63, and being connected at its lower end to the bracket arm 60 at the point illustrated. From this it follows that to move the hand lever 63 from one end of the play space 62 to the other end thereof it is necessary to tension or expand the spring 66; also, that said spring 66 will serve to prevent casual movement of the lever 63 from either of its inclined positions. This of course will have the effect to precluding casual endwise movement of the shaft 25. I would also have it understood that the connection of the link 64 with the shaft 25 is effected through a collar 25× on the shaft 25 so as not to interfere in any degree with the rotation of the shaft 25.

By particular reference to Figure 4 it will be observed that the starting spring 16 is connected at one end to the clutch member 30, as indicated by 70, and is connected at its opposite end to the clutch member 31 as indicated by 71.

The operation of my improvement will be readily understood when it is stated that in Figures 1, 2 and 4 the parts are shown in neutral position—i. e., with the spring 16 under tension. Therefore to utilize the expansion of the spring 16 to start the engine, the driver first springs the lever 63 out of engagement with the notch of play space 62 and swings the upper arm of said lever rearwardly. The said movement of the lever 63 will be attended by forward movement of the shaft 25 to engage the clutch member 27 with the clutch member 30, the driver if necessary turning the disk 28 by the direct application of his hand so as to enable the pins 34 to enter the socket 35. The driver then presses on the pedal lever 17 to engage the clutch member 7 with the clutch member 2 on the engine shaft 1, after which the driver pulls rearwardly on the rod 52 to rock the lever 48 and disengage the shoe 44 from the clutch member 30 whereupon the spring 16 will expand and rotate the shaft 25 and thereby rotate the shaft 1 and start the engine. After the engine is started as stated the clutch member 7 is disengaged from the clutch member 2 by manipulation of the pedal lever 17.

When the driver wishes without leaving his seat to utilize the rotation of the engine shaft 1 to wind the spring 16, the driver first brings about engagement of the clutch member with the clutch member 2 whereupon the shaft 25 will be rotated from the engine shaft 1. The driver then moves the lever 63 to the forward end of the play space 62 so as to put the pins 39 in the openings 37. In this way the disk 29 is caused to rotate and to wind the spring 16, it being understood that at this time the shoe 44 is in engagement with the clutch member 30. Then as the spring 16 is wound and increased in length the pins 36 by acting against the pins 39 moves the clutch member 26 and also move the shaft 25 toward the left in Figure 4. This effects the disengagement of the clutch member 26 from the clutch member 29 and it also serves to move the lever 63 back to the position shown in Figure 4, whereupon the spring 66 operates to hold the clutch member 26 out of engagement with the clutch member 29.

It will be apparent from the foregoing that the shaft 25 is turned in the same direction when it is rotated by and from the engine shaft 1 and also when it is rotated by and from the starting spring 16.

As will be readily understood from the foregoing the engine may be started in the usual manner by the manipulation of the crank 12 or may be started by the utilization of the expansion of the spring 16 in the manner described in detail; also, the spring 16 may be placed under tension by manipulation of the crank 12, or by the rotation of the shaft 25 through the medium of the wrench 55 applied as before described or by the rotation of the engine shaft 1 through the medium of the connections described.

As will be readily appreciated my improvement is susceptible of being readily installed in automobiles at present in use as well as in new automobiles.

Having described my invention, what I claim and desire to secure by Letters-Patent, is:—

1. In engine starting means, the combination of an engine shaft, a rotary and endwise movable shaft, means to connect said rotary shaft with the engine shaft, manual means to move said shaft endwise, clutch-members fast on said rotary shaft, clutch members loose on the rotary shaft, means to hold one loose clutch member against retrograde rotation, movable means loose on the rotary shaft to automatically separate the members of one clutch, a starting spring coiled about said shaft and connected at one end to said means and at its opposite end to one loose clutch member, and manually-controlled means to detachably hold said clutch member against rotation.

2. In engine starting means, the combination of an engine shaft, a rotary and endwise movable shaft, means to connect said rotary shaft with the engine shaft, manual means to move said shaft endwise, clutch-members fast on said rotary shaft, clutch members loose on the rotary shaft, means to hold one loose clutch member against retrograde rotation, movable means loose on the rotary shaft to automatically separate the members of one clutch, a starting spring coiled about said shaft and connected at one end to said means and at its opposite end to one loose clutch member, and manually-controlled means to detachably hold said clutch member against rotation, the lever complementary to the rotary shaft being spring secured.

3. In engine starting means, the combination of an engine shaft, a rotary and endwise movable shaft, means to connect said rotary shaft with the engine shaft, manual means to move said shaft endwise, clutch-members fast on said rotary shaft, clutch members loose on the rotary shaft, means to hold one loose clutch member against retrograde rotation, movable means loose on the rotary shaft to automatically separate the members of one clutch, a starting spring coiled about said shaft and connected at one end to said means and at its opposite end to one loose clutch member, and manually-controlled means to detachably hold said clutch member against rotation, the lever complementary to the rotary shaft being spring secured, manual means to directly rotate the rotary shaft from the driver's seat of an automobile, and manual engine-cranking means adapted for the manual rotation of the rotary shaft.

In testimony whereof I affix my signature.

SAMUEL B. McHENRY.